(12) United States Patent
Ekman

(10) Patent No.: US 6,330,890 B1
(45) Date of Patent: Dec. 18, 2001

(54) DEVICE WHICH COMPRISES A RAPID-COUPLING PART CONNECTABLE TO A SYSTEM OF PRESSURIZABLE FLUID AND SUCH A RAPID-COUPLING PART

(75) Inventor: Thure Ekman, Skövde (SE)

(73) Assignee: Dart Engineering AG, Zug (CH)

( * ) Notice: Subject to any disclaimer, the term of this patent is extended or adjusted under 35 U.S.C. 154(b) by 0 days.

(21) Appl. No.: 09/500,430

(22) Filed: Feb. 9, 2000

(30) Foreign Application Priority Data

Mar. 17, 1999 (SE) .................................................. 9900952

(51) Int. Cl.⁷ ...................................................... B63B 35/00
(52) U.S. Cl. .................... 137/269; 137/557; 137/614.04; 251/149.6; 73/756
(58) Field of Search .................................. 137/269, 557, 137/614.04; 251/149.6; 73/756

(56) References Cited

U.S. PATENT DOCUMENTS

| | | | |
|---|---|---|---|
| 2,419,642 | * 4/1947 | Henry | 137/614.04 |
| 2,453,741 | * 11/1948 | Bopp | 137/269 |
| 2,618,978 | * 11/1952 | Ragland | 73/756 |
| 3,024,044 | * 3/1962 | Benevento | 137/269 |
| 3,537,476 | 11/1970 | Evans . | |
| 3,550,624 | 12/1970 | Johnson . | |
| 3,760,842 | * 9/1973 | Mikiya | 137/557 |
| 4,005,847 | * 2/1977 | Ekman | 73/756 X |
| 4,123,089 | 10/1978 | Viero et al. . | |
| 4,638,668 | * 1/1987 | Leverberg et al. | 73/866.5 |
| 4,901,761 | * 2/1990 | Taylor | 137/557 |
| 5,346,177 | 9/1994 | Paulsen et al. . | |
| 5,467,964 | * 11/1995 | Ekman | 251/149.6 |

FOREIGN PATENT DOCUMENTS 0 172 996 3/1986 (EP) .
WO 95/24583 9/1995 (WO) .

* cited by examiner

*Primary Examiner*—John Rivell
(74) *Attorney, Agent, or Firm*—Connolly Bove Lodge & Hutz

(57) ABSTRACT

A nipple (1) is connectable or connected to a system (2) of pressurizable fluid (16). The first rapid-coupling part operates with a dual function in which, in a first function, the first rapid-coupling part can be coupled together with a second rapid-coupling part and in the coupling position of the parts fluid can be drained off to a first apparatus receiving the drained-off fluid and, in a second function, the first rapid-coupling part receives a probe-shaped unit, which is insertable in the first rapid-coupling part, for draining off the fluid to a quality-detecting apparatus or container apparatus; connected to the probe-shaped unit.

21 Claims, 2 Drawing Sheets

FIG. 2 A-A

DEVICE WHICH COMPRISES A RAPID-COUPLING PART CONNECTABLE TO A SYSTEM OF PRESSURIZABLE FLUID AND SUCH A RAPID-COUPLING PART

TECHNICAL FIELD

The present invention relates to a device pertaining to a first rapid-coupling part, preferably a nipple, which is connectable to a system of pressurizable fluid. As examples of such systems can be cited various types of hydraulic systems in which power production and power supply is effected by means of pressurized hydraulic oil. The invention also relates to a rapid-coupling part for systems of this order.

1. Prior Art

In hydraulic systems of this type, it is previously known to use first nipple connections by which instrument apparatuses can be connected in order, for example, to determine the fluid pressure in the system. The use of such nipples is also applied in systems which operate at high pressure, for example at pressure of 250–350 bar. The nipples can also be arranged to withstand pressure peaks which can substantially exceed the values. In the connection the pressure-measuring apparatus in question, a second rapid-coupling part is used which can be coupled together with the first coupling part or the nipple. The second rapid-coupling part, which is normally constituted by a female coupling part, is connected to the nipple in a conventional manner. The second rapid-coupling part is further connected to the pressure-measuring apparatus by some form of line or connection.

It is also previously known two use, in connection with the hydraulic systems or equivalent, a second nipple system for quality measurement of the fluid in question. The second nipple system is in this case configured as nipples for connectability to probe-shaped units which can be inserted or stuck into the nipples in order to extract a small quantity of fluid on which the quality measurement is to be conducted. The probe-shaped unit is connected to a second apparatus, which can be constituted by an instrument apparatus or by a container to be transferred to a quality-measuring apparatus in question. The quality measurement can relate, for example, to the determination of contamination level.

2. Account of the Invention

3. Technical Problem

With this type of nipple system for pressure and quality measurements, it is important for the nipples or first rapid-coupling parts in question to be able to be realized for purposeful and effective operation. There is a need, for example, to be able to reduce the number of components and modules connected to hydraulic systems of this type. In this way, for example, the number of nipples or first rapid-coupling parts will be able to be reduced in number. The main object of the invention is to solve, inter alia, this problem.

It is also important for the nipple system in question to be able to be built up and arranged with components which are known per se and in a manner which is known per se. The invention sets out to solve this problem also.

As a follow-up problem to the above, it is important that despite the product range reduction the nipple or rapid-coupling part system should be able to operate with high repeatability and with sealing functions which prevent undue oil or fluid leakage at the nipples in question. The invention solves this problem also.

A nipple or rapid-coupling system of this order for extracting parameter values in hydraulic systems should also be able to offer time reduction in terms of measurement and sampling of the fluid in the system in question. The invention solves this problem also.

4. The Solution

What primarily can be considered to be characteristic of a device pertaining to a first rapid-coupling part according to the invention is that the first rapid-coupling part operates with a dual function in which, in a first function, the first rapid-coupling part can be coupled together with a second rapid-coupling part and in the coupling position of the parts fluid can be drained off to a first apparatus receiving the drained-off fluid and, in a second function, the first rapid-coupling part is arranged to receive a probe-shaped unit, which is insertable in the first rapid-coupling part, for draining off the fluid to a second apparatus connected to the probe-shaped unit.

In refinements of the inventive concept, the first rapid-coupling part is arranged to establish, when coupled together with the second rapid-coupling part, a first flow duct through the first rapid-coupling part to the first apparatus and the first rapid-coupling part is arranged to establish, upon the insertion of the probe-shaped unit, a second flow duct through the first rapid-coupling part to the second apparatus. The first flow duct can in this case preferably be established with a first valve body, which is longitudinally displaceable when interacting with the second rapid-coupling part and via the outer side of which the first flow duct extends. The second flow duct can preferably be established by means of a second valve body, which is longitudinally displaceable when interacting with the probe-shaped unit and which is placed inside the first valve body.

What primarily can be considered to be characteristic of a rapid-coupling part according to the invention is that it comprises first and second valve systems and that the first valve system can be actuated when the rapid-coupling part is coupled together with a further rapid-coupling part for connection by the further rapid-coupling part to a first apparatus. Further characteristics are that the second valve system can be actuated by use of a probe-shaped unit for connection by the same to a second apparatus.

The first apparatus can in this case comprise a pressure-detecting apparatus also able to detect high pressures, for example 250–350 bar. The second apparatus can comprise a fluid-quality-detecting apparatus or a container (container apparatus) by means of which drained-off fluid is fed to the fluid-quality-detecting apparatus. In a preferred embodiment, the first valve system comprises a first valve body which, when the coupling parts in question are in the coupled position, is longitudinally displaceable against the action of a first spring load and via the outer side of which a first fluid duct can be established in the actuated or longitudinally displaced position of the body. The first valve body interacts in its closing position preferably with a mechanical stop, which can have the form of a metallic seat. The valve body can in this case be sealed against an external shell part by means of a sealing element applied outside the stop or seat, viewed from the free end of the rapid-coupling part, the recess for the sealing element in question being able to be applied to the first valve body and/or the shell part.

In a preferred embodiment, the second valve system is preferably situated at least substantially inside the first valve system or the first valve body. The second valve system can thus be regarded as a pilot valve system in which a first member, preferably in the form of a spherical body or ball, is actuated or can be actuated by a second spring load against a seat and can be lifted against the action of a second spring load, at least at a minor pressure which can lie within the range 1–10 bar, by means of the probe-shaped unit. The first and second spring loads are mutually coordinated so that, when the probe-shaped unit is applied, only the second valve system is actuated, i.e., the first spring load comfortably exceeds the second spring load. The first valve body preferably comprises an internal seal, by means of which the front part of the probe-shaped unit is sealable for avoidance of oil and fluid leakage during activation of the second valve system by means of the probe-shaped unit. Alternatively or by way of supplement, the probe-shaped unit can be provided with sealing members which seal against an inner surface in the first valve body. The second valve system can further comprise a second member, which is pressed against the first: member, i.e., the ball or equivalent, by-means of the second-spring load and which can have the form of a pin, the head part of which bears against the first member and the remaining part of which extends inside a spring producing the second spring load. The head part of the pin or equivalent bears with a surface against the ball or equivalent in question and the surface in question can be configured with a spherical depression in order to increase the repeatability in the action of the pin against the ball so that this is not tilted in its position against the seat or equivalent.

The first valve body is realized with a stop member for the second spring load, which stop member can be screwed in place or secured by means of friction in the first valve body. The stop member has, for example, a head-shaped part which extends wholly or partially inside a first spring producing the first spring load. The sealing elements which seal the first valve body against the shell part and the probe-shaped unit respectively are disposed in recesses which are greater than the cross sections of the sealing elements for the purpose of allowing a certain longitudinal displacement facility in the recesses for the sealing elements. Along its rear parts in the direction of longitudinal extent, the first valve body is preferably configured with firstly longitudinal guide parts which can interact with an inner wall in the shell part, and secondly with parts which are situated between the guide parts and are of lesser diameter or diameters than the inner wall. Along its front parts of its longitudinal extent, the first valve body is provided with circular cross section, at which the sealing elements are disposed. The rear parts can be realized with polygonal cross section and can have, for example, a hexagonal cross section. The seat or the stop can in this case interact with the first valve body through essentially triangular end face parts established by means of the polygonal cross section.

As a result of the above-proposed, an extremely compact and effective valve system is obtained. The actuation of the spherical member in the second valve system by means of an actuating pin of known type ensures a high repeatability in the second valve system despite the fact that this can be exposed to or can be acted upon by the higher pressure. The pin or equivalent ensures that the ball does not tilt in the seat part. The internal seal in the first valve body and/or the external seal in the probe prevent oil leakage in connection with quality measurement or other measurement. The shown arrangement having the longitudinally displaceable first valve body which is assigned a polygonal, star-shaped, etc. cross section in its rear parts and a circular cross section in its front parts enables superbly good functioning. As a result of the arrangement involving a mechanical stop or metallic seat, in which the first valve body, in a position unactuated by the second rapid-coupling part, drops down and places itself on the stop or the seat, superb reliability of the sealing arrangement between the first valve body and the shell part in question is guaranteed. The sealing arrangement does not need to be exposed to high pressure and pressure peaks in the unactuated position of the nipple or of the rapid-coupling part. By integrating the pressure detection and quality detection functions in one and the same nipple, the product range can be substantially reduced in terms of the nipple system and large time savings achieved through simplification of the actual sampling operations.

DESCRIPTION OF THE FIGURES

A currently proposed embodiment of a device pertaining to a rapid-coupling part and a rapid-coupling part according to the invention shall be described below with reference to the appended drawings, in which:

FIG. 2 shows in cross section the configuration of parts of a first valve body forming part of FIG. 1.

Figure 1:
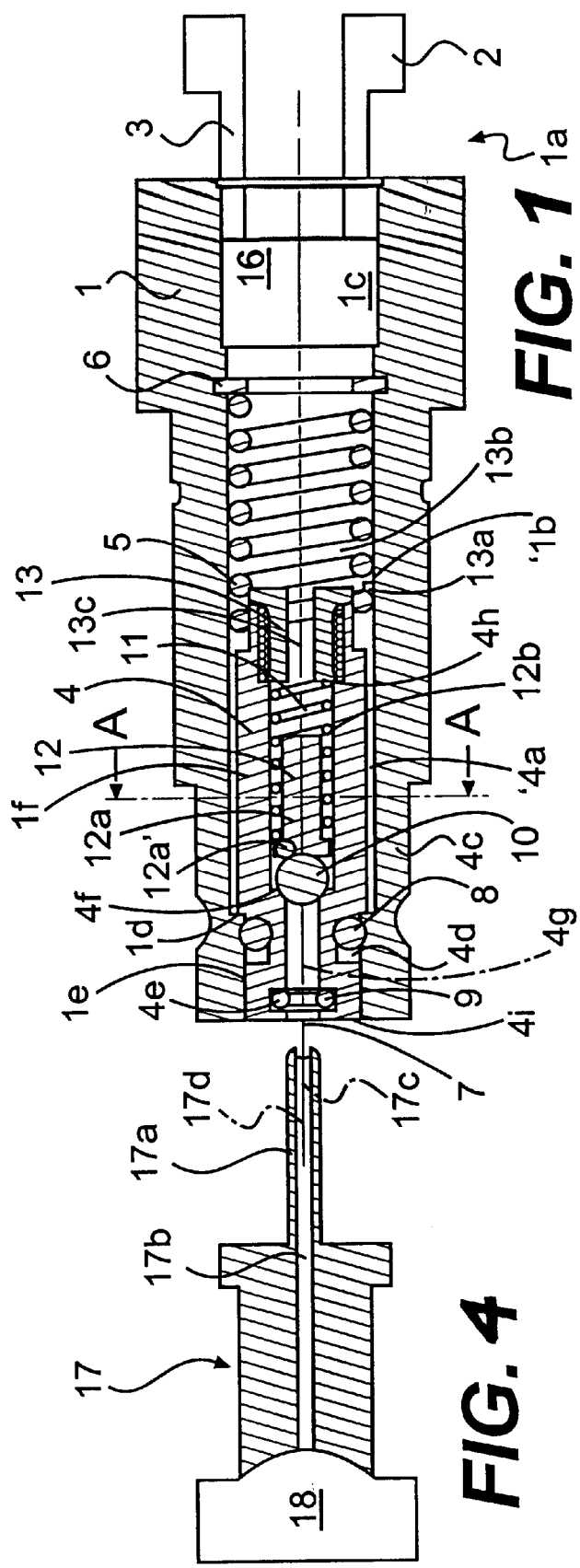
FIG. 1 shows in longitudinal section a nipple having integrated functions for pressure measurement and quality detection of fluid forming part of a hydraulic system.

In the figure, a shell part of a nipple is denoted by 1. In its rear parts 1a, the nipple can be connected to a symbolically indicated system 2, which can be constituted, for example, by a hydraulic system of a conventional type. The connection of the nipple to the system, a pipe, a mounting part, a shell, etc. in this, can be effected through a conventional line connection 3. The nipple 1 has a first valve system, which is formed by a first valve body 4 and a spring 5 which can interact therewith. The valve body and the spring are disposed in a recess 1b in the nipple shell. The nipple shell can be constituted in principle by a perforated cylinder. The nipple shell is provided with an internal annular stop washer 6 for the spring 5 and has at the back a space 1c for the line connection 3. The first valve body 4 is configured in its rear parts with a hexagonal cross section, which can be seen from FIG. 2. In its front parts 4b, the first valve body is realized with a circular cross section. A transition between the rear and front parts on the first valve body is denoted by 4c in FIG. 1.

This transition extends essentially perpendicularly relative to the longitudinal extent of center axis 7 of the body. In the closed position of the valve body according to FIG. 1, the transverse parts interact at the transition 4c with a mechanical stop 1d. The nipple shell part is preferably realized in metallic material, which means that the valve body in the shown closed position bears with metallic contact against the seat 1d. The first valve body is provided in the front parts 4b with an external recess 4d and an internal recess 4e for sealing elements 8 and 9 respectively. The recesses 4d and 4e are herein greater than the cross section of the seals to allow a certain displacement in the direction of longitudinal displacement of the nipple in connection with the maneuvering of the nipple 1 in question. The spring 5 ensures that the first valve body assumes its closing position against the seat according to FIG. 1 even when there is low or no pressure available in the present system to which the nipple can be continuously or temporarily connected. The pressure in question in the system 2 helps together with the spring 5 to achieve an effective closing function by means of the first valve body. The positioning of the seal 8 in relation to the seat 1*d* means that a non-exposed position for the seal in question is obtained by virtue of the fact that high pressure peaks do not cause the seal to be pressed between two metallic parts. The first valve body can also be realized in metal.

The nipple body 1 is also provided with a second valve system which is disposed inside the first valve body. The second valve system comprises a ball 10 which is pressed against an internal seat 4*f* in the first valve body. The latter is provided with inner recesses 4*g* and 4*h* extending in the longitudinal direction of the valve body. The elongated recesses have different diameters, the diameter for the recess 4*g* measuring less than the diameter for 4*h*. The seat 4*f* is present at the transition of the recesses. The second valve system comprises a spring 11 which is disposed in the recess 4*h* and which presses the ball or the spherical body 10 against the seat 4*f*. In a preferred embodiment, the spring 11 actuates the ball 10 through an actuating member 12. In an illustrative embodiment, the actuating member can have a pin-shaped configuration with a head-shaped part 12*a* which bears against the ball 10 or equivalent through a flat front face 12*a*, which can be provided with a small spherical depression (not shown in FIG. 1) in order to define the actuating function between the head-shaped part 12*a* and the ball 10. The actuating member also comprises a part 12*b* which extends from the head part 12*a* and serves as a guide part. The guide part 12*b* extends inside the spring 11. As a result of the guide function and the spherical notch in the head part 12*a*, the abovementioned repeatability is successfully obtained. The valve-shaped body is also provided with a stop member 13 for the spring 11. The stop member 13 can be arranged such that it can be screwed into the valve body, in the inner parts thereof, by means of a thread 13*a*. Alternatively the body 13 is capable of being pressed down with friction into the valve body and being thereby detained in the valve body. The stop member 13*a* has a head-shaped part which extends wholly or partially inside the spring 5 for actuation of the first valve body. The outer shape of the nipple is characterized in that it is realized according to the standard for nipples of this type.

Figure 3:
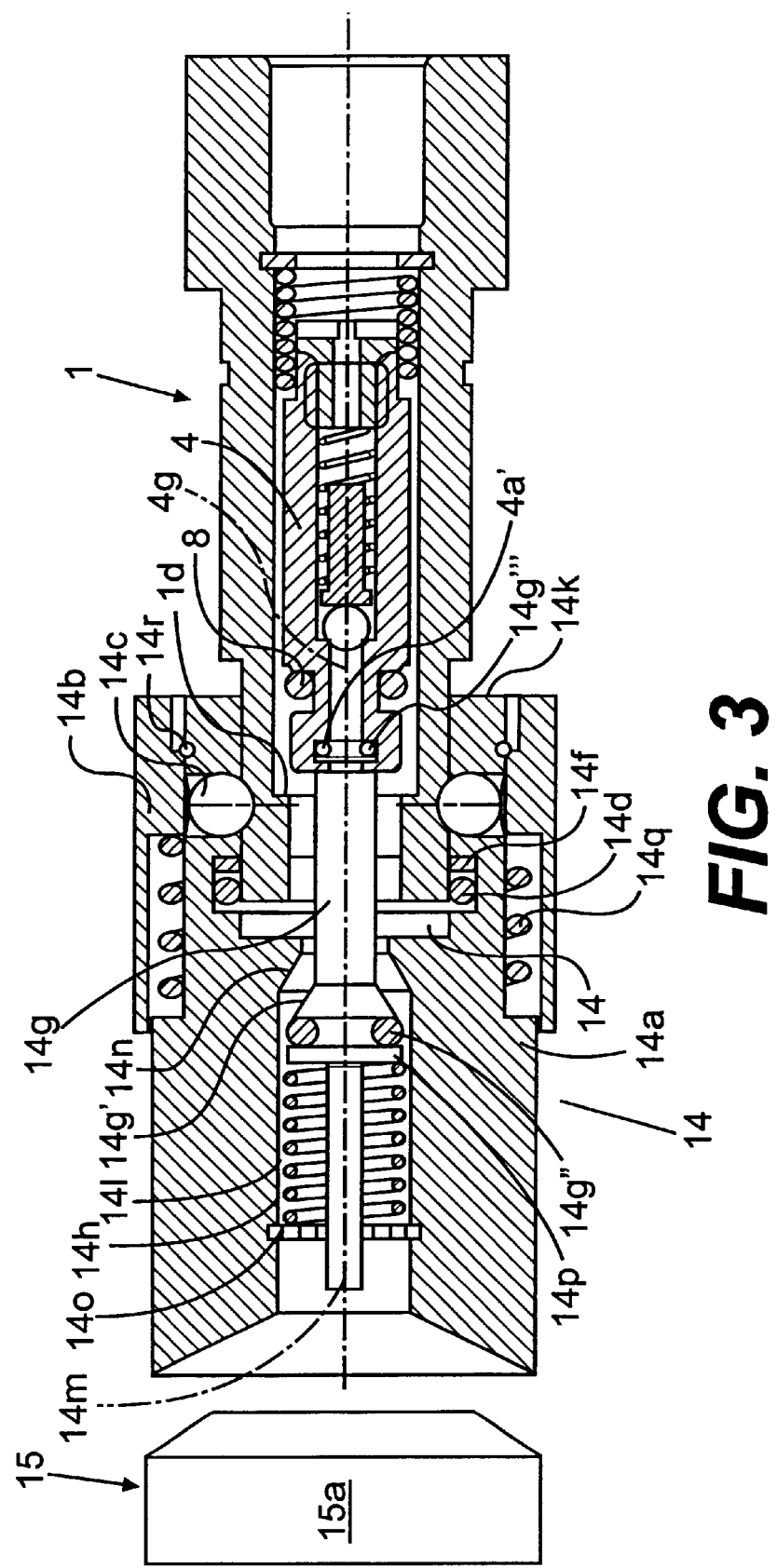
FIG. 3 shows in longitudinal section the configuration of a second rapid-coupling part and the connection to the rapid-coupling part according to FIG. 1.

According to FIG. 3, a second coupling part configured as a female part is connectable to the externally standard-shaped nipple 1. The female part has been denoted by 14 and has standard configuration. On the shell 14*a* of the female part there is arranged a locking sleeve 14*b*. By means of the locking sleeve and locking balls 14*c*, locking is effected in a known manner to the outer side of the nipple 1 by way of grooves in the latter. In the coupling position according to FIG. 3, the parts 1 and 14 are sealed by means of a seal 14*d* which can be disposed in an internal groove 14*e* in which a "back-up" washer 14*f* is also disposed. The female part 14 is provided with an internal, longitudinally displaceable valve body 14*g*. In the unactuated position for the female part 14, the valve body 14*g* is actuated by means of a spring 14*h* so that a seat part 14 *g'* having an O-ring seal 14*g"* is actuated against a seat 14*i* so that the seat is sealed off by means of the O-ring. In the position shown in FIG. 3, the valve body is pressed backwards against the action of the spring 14*h*. The pressing force is achieved by mutual manual action upon the parts 1 and 14 and by interaction between a front face 14*g'''* of the valve body 14*g* and a front face 4*i* of the valve body 4. The diameter of the front face 14*g'''* is greater than the recess diameter 4*g*. In the unactuated position of the female part, the front face 14*g'''* is found in essentially the same plane as the front face 14*k* of the female part. The valve body 14*g* is disposed in internal recesses 14*l* and 14*m*. The valve body has a rear part 14*n*, which extends inside the spring 14*h*. A stop member 14*c* for the spring 14*h* is disposed in the recess. The valve body is guided up in the radial direction in the recess 14*l* by means of one or more wing-shaped elements 14*p*. The recess is arranged so as to receive and, by means of the balls 14*c*, lock the nipple end in place when the parts 1 and 14 are coupled together. The seat 14*i* is disposed between the recesses 14*l* and 14*m*. In the open position according to FIG. 3, fluid from the nipple can pass onto the outer side of the valve body 14*g*, via the open seat 14*i*, and through recesses in the wing-shaped elements, via or through the stop member and to the recess 15. A spring in the locking sleeve is denoted by 14*q*. A stop ring for the locking sleeve is indicated by 14*r*. This stop ring or stop member can also be arranged to guide the valve body 14*g* radially together with the wing-shaped elements. To the second rapid-coupling part 14, configured as a female part, there is connected a pressure-detecting apparatus 15. This connection can be integrated with the female part or can be connected to the female part by a line. The connection of the female part to the connecting part of the apparatus 15 can be realized in a conventional manner and shall not therefore be described in further detail here. When the female coupling part is applied to the nipple part 1, the first valve body 4 is longitudinally displaced in the inward direction in the recess 1*b* and the seal 8 is exposed. Fluid 16 is thereupon able to pass onto the outer side of the first valve body, via the open seat 1*d* and the exposed seal 8. The pressure measurement can in this case be accomplished by means of the pressure-measuring apparatus. In decoupling, the first valve body is returned by means of its spring against the seat 1*d* and the seal 8 enters into sealing interaction with the inner wall 1*e*. During this measurement, the second valve system 10, 11, 12 remains unactuated.

Figure 4:
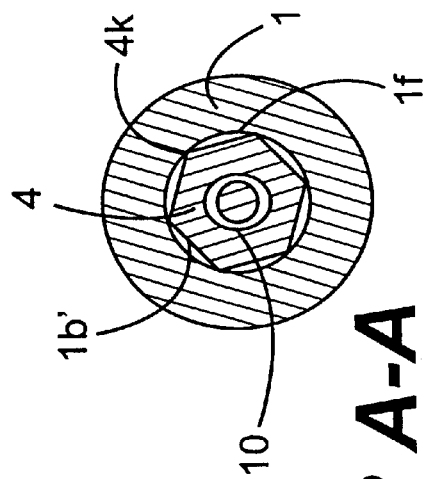
FIG. 4 shows in longitudinal section the configuration of a probe-shaped unit.

In a quality measurement which is separated from the pressure-measuring function according to the above, a probe unit 17 according to FIG. 4 is used. The probe unit comprises a front part 17*a* which can be introduced into the recess 4*g* in the first valve body. Upon insertion into the recess, sealing is accomplished by means of the sealing element 9, which is pressed against the outer surface of the front part 17*a*. Upon the insertion of the front part 17*a*, the ball 10 is actuated from its seat 4*f* against the action of the spring 11. A flow duct is hereupon established through an inner recess 13*c* in the stop member 13, the recess 4*h*, the outer side of the actuating member, the outer side of the ball 10 and into an inner recess 17*b* extending inside the probe-shaped unit 17, in its longitudinal direction, to a quality-measuring apparatus 18 which can be of a conventional a type which will not be described in further detail here. Alternatively, the quantity of fluid drained off through the flow duct can be transferred to a fluid container which is connected to the probe unit and which is then in turn transferred to a quality-measuring apparatus. A front part 17*c* of the front parts 17*a* of the probe unit is realized for interaction with the spherical form of the ball 10. The front part is therefore realized with tubular form and is provided moreover with a depression or depressions 17*d*, via which the drained-off fluid can pass from the recess 4*h* and into the recess 17*b* in the probe via the ball 10. Fluid which passes onto the outer side of the front part 17*a* is prevented from leaking out to the environment by means of the seal 9. The connection of the probe can be effected with minor pressure in the system 2, for example with pressure within the range 1–10 bar. The minor pressure shall ensure that fluid is able to penetrate the probe-shaped unit. On the other hand, it is not necessary to connect the probe unit against high pressure in the system 2, even though this would actually be possible through the arrangement of pressure-reducing members, for example, in the probe-shaped unit. The connection of the pressure-measuring apparatus according to the above, i.e., the connection of the second female-shaped rapid-coupling part, is normally effected when the pressure is lowered in the system 2, after which the system is activated so that the said pressure in question can be measured. This means that the pressure-measuring apparatus can be connected up for a certain time during which it is wished to note or register the pressure in question. It will also be noted that the washer 6 for the stop function of the spring 5 is annular, thereby enabling fluid to pass between the system 2 and the space 1b. The various parts in terms of nipple, female part, probe, etc. are preferably realized in metal material. As sealing elements, conventional sealing rings, having a Shore number of 70–90, are used.

As examples of hydraulic systems can be cited fixed and mobile hydraulic systems, for example such systems which are disposed in or on overhead cranes, lifts, construction machinery, loaders, excavators, forestry machinery, etc.

The invention is not limited to the embodiment shown by way of example above but can be subject to modifications within the scope of the following patent claims and the inventive concept.

What is claimed is:

1. A first rapid-coupling part which is connectable to a system of pressurizable fluid, the first rapid-coupling part provides a dual function in which the first rapid-coupling part can be coupled together with a second rapid-coupling part and, in the coupling position of the parts, fluid can be drained off to a first apparatus receiving the drained-off fluid and, in a second function, the first rapid-coupling part receives a probe-shaped unit, inserted in the first rapid-coupling part, for draining off the fluid to a second apparatus connected to the probe-shaped unit.

2. A device according to claim 1, wherein the first rapid-coupling part, when coupled together with the second rapid-coupling part, provides a first flow duct through the first rapid-coupling part to the first apparatus.

3. A device according to claim 1, wherein the first rapid-coupling part establishes, upon the insertion of the probe-shaped unit, a second flow duct through the first rapid-coupling part to the second apparatus.

4. A device according to claim 3, wherein the first flow duct can be established by means of a first valve body, which is longitudinally displaceable when interacting with the second coupling part to provide on the outer side the first flow duct.

5. A device according to claim 4, wherein the second flow duct can be established by means of a second valve body, which is displaceable when interacting with the probe-shaped unit.

6. A device according to claim 5, wherein the second valve body is placed inside the first valve body.

7. A rapid-coupling part, having first and second valve systems, the first valve system is actuated when the rapid-coupling part is coupled together with a further rapid-coupling part for connection of the interior of the first-named coupling by the further rapid-coupling part to a first apparatus, and the second valve system is actuated by use of a probe-shaped unit inserted into the interior of the first coupling thereby coupling said first valve system to a second apparatus.

8. A rapid-coupling part according to claim 7, wherein the first apparatus comprises a pressure-detecting apparatus able to detect high pressures.

9. A rapid-coupling part according to claim 1, wherein the second apparatus comprises a fluid-quality-detecting apparatus or a container, etc. which is connectable to fluid-quality-detecting apparatus.

10. A rapid-coupling part according to claim 7, wherein the first valve system comprises a first valve body which, when the coupling parts are in the coupled position, is longitudinally displaceable against the action of a first spring load providing along an outer side thereof a first fluid duct in the actuated position of the first valve body.

11. A rapid-coupling part according to claim 10, wherein the first valve body, in its closing position, interacts with a mechanical stop formed as a metallic seat, and, the valve body is sealed against an external shell part by means of a sealing element applicable outside said stop or seat.

12. A rapid-coupling part according to claim 7, wherein the second valve system is situated at least substantially inside the first valve system and serves as a pilot valve system in which a first member, in the form of a spherical body, is actuated by a second spring load against a seat and can be lifted from the seat against the action of a second spring load, at a minor pressure within the range 1–10 bar, by means of the said probe-shaped unit.

13. A rapid-coupling part according to claim 12, wherein the first and second spring loads are mutually coordinated so that, when the probe-shaped unit is applied, only the second valve system is actuated.

14. A rapid-coupling part according to claim 10, wherein the first valve body has an internal seal and/or in that the probe-shaped unit comprises an external seal, by means of which seal the front part of the probe-shaped unit can be sealed to avoid fluid leakage while the second valve system is being activated by means of the probe-shaped unit.

15. A rapid-coupling part according to claim 12, wherein the second valve system comprises a second member, which is pressed against the first member by means of the second spring load.

16. A rapid-coupling part according to claim 15, wherein the second member has the form of a pin, having a head-shaped part which bears against the spherical first member and a part extending from the head-shaped part inside a spring, the head-shaped part includes a spherical depression interacting with the spherical member.

17. A rapid-coupling part according to claim 14, wherein the first valve body includes a stop member for supporting the second spring load, which stop member can be screwed in place or secured by means of friction in the first valve body and includes a head-shaped part which extends at least partially inside a first spring producing the first spring load.

18. A rapid-coupling part according to claim 13, wherein the sealing elements which seal the first valve body against an internal wall in the shell part and against the probe-shaped unit respectively are disposed in recesses which in the longitudinal direction of the rapid coupling realized with continuing sealing in the recesses for the sealing elements.

19. A rapid-coupling part according to claim 10, wherein the first valve body includes along rear parts of its longitudinal extent longitudinal guide parts which are guided by an inner wall in the shell part and includes parts which are situated between the guide parts and are of lesser diameters than the inner wall, and said valve body is provided with circular cross section, along which said sealing elements are disposed.

20. A rapid-coupling part according to claim 19, wherein said rear parts are realized with star-shaped cross section.

21. A rapid-coupling part according to claim 20, wherein the seat can interact with the first valve body through triangular end face parts established by means of the polygonal cross section of the said rear parts.

\* \* \* \* \*